F. C. PRATT.
FRUIT SLICER.
APPLICATION FILED APR. 27, 1921.
1,389,270.
Patented Aug. 30, 1921.
2 SHEETS—SHEET 1.
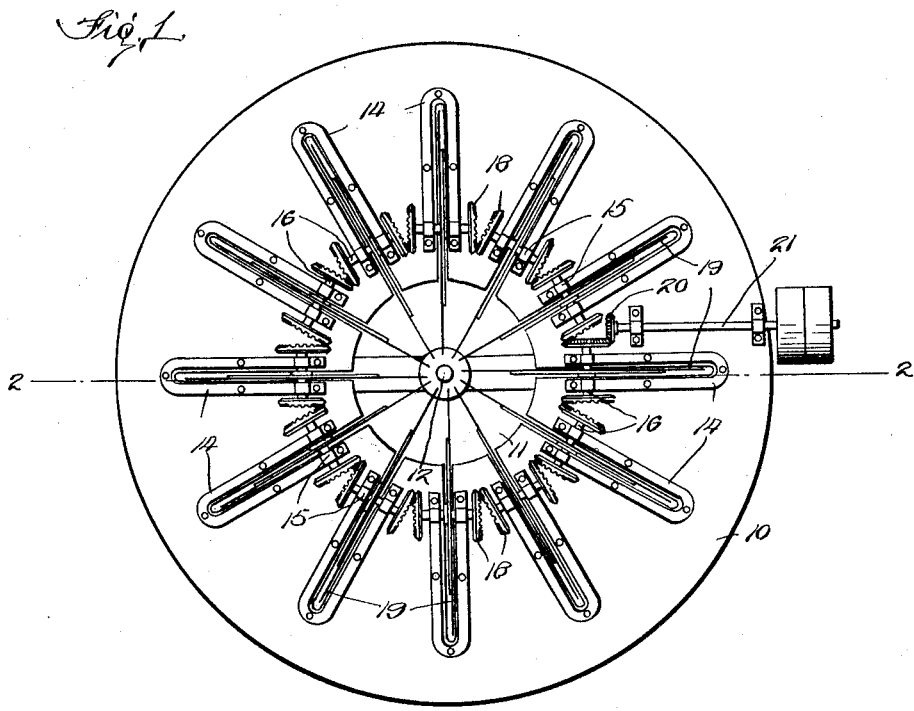
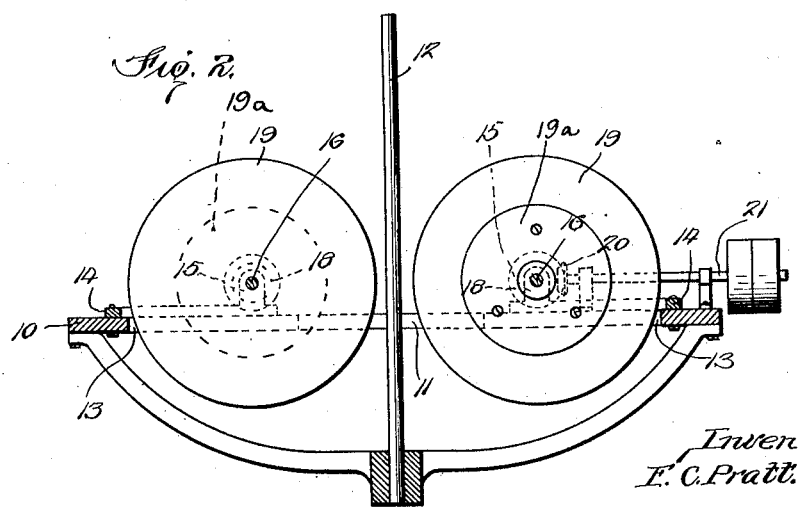
Inventor:
F. C. Pratt.
Watson E. Coleman Attorney

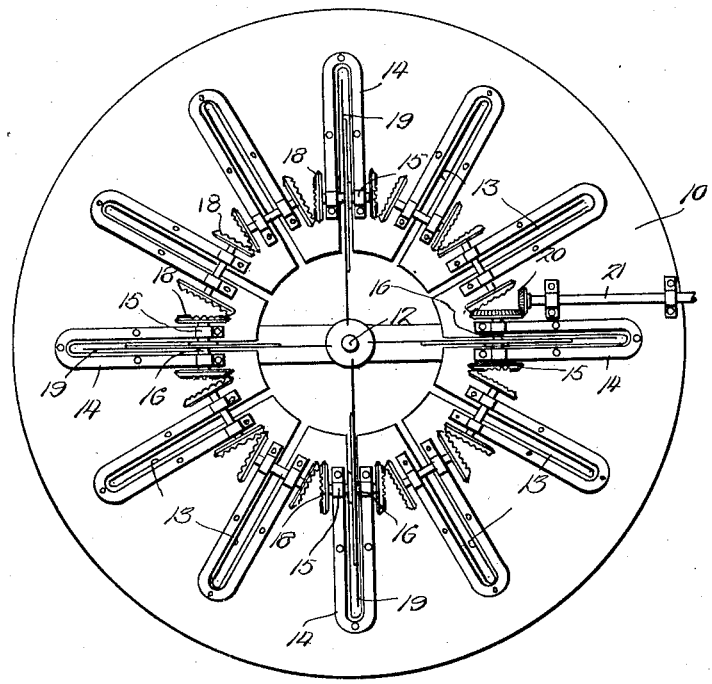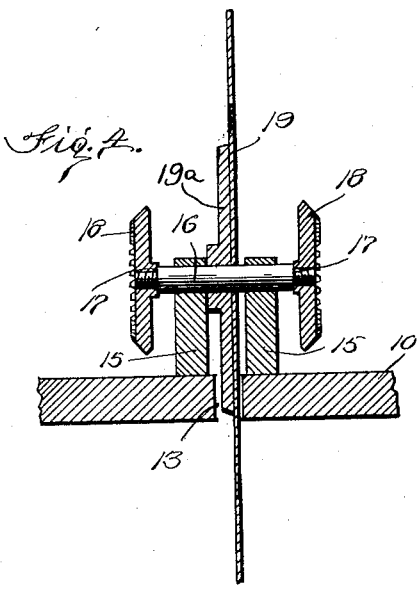

UNITED STATES PATENT OFFICE.

FRED C. PRATT, OF FARMINGTON, MAINE.

FRUIT-SLICER.

1,389,270.   Specification of Letters Patent.   Patented Aug. 30, 1921.

Application filed April 27, 1921. Serial No. 464,777.

*To all whom it may concern:*

Be it known that I, FRED C. PRATT, a citizen of the United States, residing at Farmington, in the county of Franklin and State of Maine, have invented certain new and useful Improvements in Fruit-Slicers, of which the following is a specification, reference being had to the accompanying drawings.

This invention relates to fruit slicers, and has for an important object thereof the provision of a machine for slicing fruit into a predetermined number of sections after the same has been pared and cored or pitted.

A further object of the invention is to provide a device of this character which will accomplish the subdivision of the fruit without crushing the same, and wherein the cutting knives form a feeding means for causing the fruit to pass through the machine, thereby eliminating the crushing.

A further object of the device is the provision of a fruit slicing machine comprising a central support upon which the fruit is placed and a plurality of radial disks arranged about the support in predetermined angular relation and rotated so that they engage the fruit to cut the same and at the same time feed the fruit through the machine.

Other objects and advantages of the invention will become apparent throughout the course of the following description.

In the accompanying drawings, wherein for the purpose of illustration is shown a preferred embodiment of my invention, and wherein like reference characters designate like parts throughout:

Figure 1 is a plan view of a fruit slicing machine constructed in accordance with my invention;

Fig. 2 is a section on the line 2—2 of Fig. 1;

Fig. 3 is a plan view showing certain of the cutting disks removed and the drives substituted, and Fig. 4 is an enlarged section taken through one of the cutting disks showing the manner of mounting the same.

Referring now more particularly to the drawings, the numeral 10 indicates a supporting blade provided approximately centrally thereof with an opening 11 of sufficient size to permit ready passage of the fruit therethrough. The blade is preferably horizontally arranged and has extending therethrough, centrally of the opening, a guide member 12 of sufficient size to pass through the opening formed in coring or pitting the fruit.

Radiating from the opening 11 is a plurality of slots 13 preferably twelve in number. The numeral 14 indicates a U-shaped attaching member adapted to pass about one end of the slot 13 and be secured to the plate 10. This support embodies bearings 15 in which is rotatably mounted a shaft 16, it being of course understood that a support 14 is provided for each of the slots 13. Each shaft 16 has its ends reduced, as at 17, to form a shoulder from the shaft, and the reduced ends are screw-threaded in opposite directions for the reception of gears 18 which abut the shoulders formed by the reduction of the shaft. The gears 18 at the ends of each of the shafts 16 mesh with the gear upon the adjacent end of the shafts at each side thereof so that the shafts 16 are driven by one another. Upon each shaft 16 is mounted a disk $19^a$, carrying a knife, and these knives operate within the slots 13.

A drive of any suitable character may be employed, this being at present illustrated as a beveled gear 20, meshing with one of the gears 18 and mounted upon a power shaft 21 driven in any suitable manner. When it is desired to form fewer subdivisions of the fruit this is done by removing the bolts holding the U-shaped member 14 to the member 10 and then removing the gear 18 from the shaft 16. The collar $19^a$ together with the disk knife 19 is then removed from the shaft 16, the gear 18 is replaced on the shaft 16, and the U-shaped member 14 is then replaced and attached to the member 10. In other words the U-shaped member 14, the shafting 16 and the gear 18 remain just the same as when cutting the maximum number of sub-divisions. By this method one can cut 2, 3, 4, 6, 8, or 12 on a 12 sub-division machine without any extra or change gears or parts. All that is necessary is to remove sufficient of the collars $19^a$ and disk knives 19.

In the use of my device the fruit which has previously been pitted or cored is placed upon the guide or spindle 12 so that the spindle projects through the opening formed in pitting or coring and moves downwardly by gravity into engagement with the knives or disks 19. Upon being engaged by the disks the drive of which is such that the peripheral portions thereof next adjacent the spindle 12 are moving downwardly, the fruit is simultaneously sliced and fed through the machine. It will be obvious that this manner of feeding the fruit will prevent the crushing so often occurring where the fruit is moved against the cutting knives by force.

Many changes being possible in the shape, size and arrangement of the parts hereinbefore set forth without departing from the spirit of my invention, I do not limit myself to the specific structure thereof except as hereinafter claimed.

What I claim is:

1. In a fruit slicing machine, a vertical guiding rod fitting the cored opening in the fruit, a plurality of cutting knives arranged about said guiding rod and having the peripheries thereof extending adjacent the guiding rod, and means for rotating said knives to cause the peripheries thereof adjacent the guiding rod to travel toward the discharge end of the machine.

2. In a fruit slicing machine, a vertical guiding rod fitting the cored opening in the fruit, a plurality of cutting knives arranged in a circle about said guiding rod and having the peripheries thereof extending adjacent the guiding rod, and means for rotating said knives to cause the peripheries thereof adjacent the guiding rod to travel toward the discharge end of the machine, embodying interconnected shafts upon which said knives are mounted, and means for driving one of said shafts.

3. In a fruit slicing machine, a vertical guiding rod fitting the cored opening in the fruit, a plurality of cutting knives arranged about said guiding rod and having the peripheries thereof extending adjacent the guiding rod, and means for rotating said knives to cause the peripheries thereof adjacent the guiding rod to travel toward the discharge end of the machine, said cutting knives being removable from the shafts thereof.

In testimony whereof I hereunto affix my signature.

FRED C. PRATT.